ns*

(12) United States Patent
Sun et al.

(10) Patent No.: US 10,627,763 B2
(45) Date of Patent: Apr. 21, 2020

(54) INFORMATION PROCESSING SYSTEM

(71) Applicant: KYOCERA DOCUMENT SOLUTIONS INC., Osaka (JP)

(72) Inventors: Zhenyu Sun, Osaka (JP); Masafumi Sato, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 315 days.

(21) Appl. No.: 15/720,664

(22) Filed: Sep. 29, 2017

(65) Prior Publication Data

US 2018/0095396 A1 Apr. 5, 2018

(30) Foreign Application Priority Data

Oct. 3, 2016 (JP) .................. 2016-195362
Oct. 3, 2016 (JP) .................. 2016-195363
Oct. 25, 2016 (JP) .................. 2016-208415

(51) Int. Cl.
*G03G 15/00* (2006.01)
*G06F 21/60* (2013.01)
(Continued)

(52) U.S. Cl.
CPC ....... *G03G 15/5091* (2013.01); *G06F 3/1204* (2013.01); *G06F 3/126* (2013.01);
(Continued)

(58) Field of Classification Search
CPC ............ G06F 3/1226; G06F 3/1231; G06F 3/1236–3/1238; G06F 3/126; G06F 3/1268–3/1271; G06F 3/1284–3/1291; G06F 3/1296; G06F 21/608; H04L 29/06823–29/0685; H04L 41/12;
(Continued)

(56) References Cited

U.S. PATENT DOCUMENTS 6,466,328 B1 * 10/2002 Bradley ................ G06F 3/1211
358/1.15
6,708,187 B1 * 3/2004 Shanumgam ....... H04L 41/0233
(Continued)

FOREIGN PATENT DOCUMENTS

JP 2006-252471 A 9/2006
JP 2011-114538 A 6/2011

*Primary Examiner* — Brendan Y Higa
(74) *Attorney, Agent, or Firm* — Li & Cai Intellectual Property (USA) Office

(57) ABSTRACT

A master server includes a mapping management unit that returns, with respect to an address inquiry request for a site server to be in cooperation with a PC, the address inquiry request being sent from the PC, an IP address of the site server to be in cooperation with the PC that sent the address inquiry request. The site server includes an authentication processing unit that authenticates the user in response to an authentication request for the user from the PC, and returns an authentication result to the PC, a permission information providing unit that, when the authentication processing unit succeeds in authentication, obtains the permission information corresponding to the user from the second memory, and provides the permission information to the PC that sent the authentication request, and a second spooler that spools job data from the PC, and outputs the job data to the image forming apparatus.

5 Claims, 17 Drawing Sheets

(51) Int. Cl.
*H04N 1/00* (2006.01)
*G06F 3/12* (2006.01)
*H04L 29/06* (2006.01)
*H04L 29/12* (2006.01)
*G06F 21/84* (2013.01)

(52) U.S. Cl.
CPC .......... *G06F 3/1231* (2013.01); *G06F 3/1236* (2013.01); *G06F 3/1238* (2013.01); *G06F 3/1268* (2013.01); *G06F 3/1288* (2013.01); *G06F 21/608* (2013.01); *H04L 29/06823* (2013.01); *H04L 61/2007* (2013.01); *H04L 61/2503* (2013.01); *H04L 63/08* (2013.01); *H04L 63/0892* (2013.01); *H04L 63/10* (2013.01); *H04N 1/00204* (2013.01); *H04N 1/00416* (2013.01); *G06F 21/84* (2013.01); *G06F 2221/2101* (2013.01)

(58) Field of Classification Search
CPC .. H04L 61/1541; H04L 61/20–61/2015; H04L 61/25–61/2503; H04L 61/6068; H04L 63/08; H04L 63/0892; H04L 63/10–63/105
See application file for complete search history.

(56) References Cited

U.S. PATENT DOCUMENTS

| | | | |
|---|---|---|---|
| 2003/0005100 A1* | 1/2003 | Barnard | H04L 29/12113 709/223 |
| 2003/0030841 A1* | 2/2003 | Parry | G06F 3/1205 358/1.15 |
| 2005/0049837 A1* | 3/2005 | Reese | G06F 3/1203 702/188 |
| 2009/0009802 A1* | 1/2009 | Shaw | G06F 21/608 358/1.15 |
| 2011/0022812 A1* | 1/2011 | van der Linden | G06F 9/5077 711/163 |
| 2011/0122439 A1 | 5/2011 | Sato et al. | |
| 2015/0212763 A1* | 7/2015 | Sharpe | G06F 3/126 358/1.15 |
| 2016/0259601 A1* | 9/2016 | Dalaa | G06F 3/1204 |
| 2016/0283176 A1* | 9/2016 | Masuda | H04N 1/00244 |

* cited by examiner

INFORMATION PROCESSING SYSTEM

CROSS REFERENCE TO RELATED APPLICATION

This application claims the benefit of Japanese Priority Patent Applications JP 2016-195362 filed Oct. 3, 2016, JP 2016-195363 filed Oct. 3, 2016, and JP 2016-208415 filed Oct. 25, 2016, the entire contents of which are incorporated herein by reference.

BACKGROUND OF THE INVENTION

1. Field of the Invention

The present disclosure relates to an information processing system, in which printing is executed while print policies for respective users are applied in an environment where management servers are distributed in a headquarter site and branch-office sites.

2. Description of Related Art

According to a recent technique, desired processing is executed where a server is in cooperation with client PCs (Personal Computers) connected via a network.

It is desirable to provide an information processing system with which time and effort for setting configurations of respective PCs may be reduced. It is desirable to provide an information processing system with which a PC may obtain permission information from an appropriate site server and generate job only by setting an IP address of a master server irrespective of a branch-office to which the PC belongs. It is desirable to provide an information processing system with which use situations of respective site servers may be confirmed only by logging in to a master server.

SUMMARY OF THE INVENTION

According to an embodiment of the present disclosure, there is provided an information processing system, including:
  a master server at a headquarter site;
  an image forming apparatus at a branch-office site;
  a site server at the branch-office site; and
  a personal computer at the branch-office site, in which
  the master server includes
    a first ROM (Read Only Memory) that stores a first information processing program,
    a first processor that executes the first information processing program, and
    a first communication device capable of communicating with the site server and the personal computer,
  the first processor executes the first information processing program to function as
    a mapping management unit that returns, with respect to an address inquiry request for the site server to be in cooperation with the personal computer, the address inquiry request being sent from the personal computer, an IP address of the site server to be in cooperation with the personal computer that sent the address inquiry request,
  the site server includes
    a second ROM that stores a second information processing program,
    a second memory that stores permission information, the permission information defining a function that can be used by a user out of functions provided by the image forming apparatus,
    a second processor that executes the second information processing program, and
    a second communication device capable of communicating with the master server, the personal computer, and the image forming apparatus,
  the second processor executes the second information processing program to function as
    an authentication processing unit that authenticates the user in response to an authentication request for the user from the personal computer, and returns an authentication result to the personal computer,
    a permission information providing unit that, when the authentication processing unit succeeds in authentication, obtains the permission information corresponding to the user from the second memory, and provides the permission information to the personal computer that sent the authentication request, and
    a second spooler that spools job data from the personal computer, and outputs the job data to the image forming apparatus,
  the personal computer includes
    a third ROM that stores a third information processing program,
    a third memory that stores registry,
    a third processor that executes the third information processing program, and
    a third communication device capable of communicating with the master server and the site server, and
  the third processor executes the third information processing program to function as
    an address inquiry unit, an IP address of the master server being configured in the address inquiry unit, that, when receiving a job generation instruction from the user, makes an inquiry to the master server about an IP address of the site server to be in cooperation with the personal computer, and obtains an inquiry result,
    an authentication request unit that requests the site server to be in cooperation with the personal computer to authenticate the user on the basis of the inquiry result,
    a permission information obtaining unit that obtains the permission information from the permission information providing unit of the site server to be in cooperation with the personal computer,
    a job generating unit that generates the job data on the basis of the permission information obtained by the permission information obtaining unit, and embeds the IP address of the site server to be in cooperation with the personal computer in the job data on the basis of the inquiry result,
    a mode configuration storing unit that stores an automatic-detection-mode configuration in the registry,
    a first spooler that spools the job data generated by the job generating unit,
    a mode configuration retrieving unit that retrieves the automatic-detection-mode configuration from the registry,
    an address extracting unit that extracts the IP address of the site server to be in cooperation with the personal computer from the job data output from the first spooler, the IP address being embedded in the job data,
    a destination switcher unit that sends the job data to the second spooler of the site server on the basis of the extracted IP address, and an operation switcher unit that switches an operation of the destination switcher unit on the basis of the automatic-detection-mode configuration retrieved from the registry.

According to an embodiment of the present disclosure, there is provided an information processing system, including:

a master server at a headquarter site;
an image forming apparatus at a branch-office site;
a site server at the branch-office site; and
a personal computer at the branch-office site, in which
the master server includes
a first ROM that stores a first information processing program,
a first processor that executes the first information processing program, and
a first communication device capable of communicating with the site server and the personal computer,
the first processor executes the first information processing program to function as
a mapping management unit that returns, with respect to an address inquiry request for the site server to be in cooperation with the personal computer, the address inquiry request being sent from the personal computer, an IP address of the site server to be in cooperation with the personal computer that sent the address inquiry request,
the site server includes
a second ROM that stores a second information processing program,
a second memory that stores permission information, the permission information defining a function that can be used by a user out of functions provided by the image forming apparatus,
a second processor that executes the second information processing program, and
a second communication device capable of communicating with the master server, the personal computer, and the image forming apparatus,
the second processor executes the second information processing program to function as
an authentication processing unit that authenticates the user in response to an authentication request for the user from the personal computer, and returns an authentication result to the personal computer,
a permission information providing unit that, when the authentication processing unit succeeds in authentication, obtains the permission information corresponding to the user from the second memory, and provides the permission information to the personal computer that sent the authentication request, and
a second spooler that spools job data from the personal computer, and outputs the job data to the image forming apparatus,
the personal computer includes
a third ROM that stores a third information processing program,
a third processor that executes the third information processing program, and
a third communication device capable of communicating with the master server and the site server, and
the third processor executes the third information processing program to function as
an address inquiry unit, an IP address of the master server being configured in the address inquiry unit, that, when receiving a job generation instruction from the user, makes an inquiry to the master server about an IP address of the site server to be in cooperation with the personal computer, and obtains an inquiry result,
an authentication request unit that requests the site server to be in cooperation with the personal computer to authenticate the user on the basis of the inquiry result,
a permission information obtaining unit that obtains the permission information from the permission information providing unit of the site server to be in cooperation with the personal computer,
a job generating unit that generates the job data on the basis of the permission information obtained by the permission information obtaining unit,
a first spooler that spools the job data generated by the job generating unit, and
a destination switcher unit that sends the job data output from the first spooler to the second spooler of the site server.

According to an embodiment of the present disclosure, there is provided an information processing system, including:

a master server at a headquarter site; and
a plurality of site servers respectively at a plurality of branch-office sites, in which
each of the plurality of site servers includes
a second ROM that stores a second information processing program,
a second processor that executes the second information processing program, and
a second communication device capable of communicating with the master server,
the second processor executes the second information processing program to function as
a use situation information providing unit that collects a use situation of the site server, and provides the use situation information to the master server,
the master server includes
a first ROM that stores a first information processing program,
a first processor that executes the first information processing program,
a first memory, and
a first communication device capable of communicating with the site server and a personal computer for a manager, and
the first processor executes the first information processing program to function as
a use situation information obtaining unit that collects the use situation information provided by the use situation information providing unit, and stores the use situation information in the first memory, and
a use situation information management unit that obtains, in response to a use situation confirmation request for the site server from the personal computer for a manager, the use situation information stored in the first memory, and provides the use situation information to the personal computer for a manager.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 illustrates an example of the IP address mapping table 17a;

DETAILED DESCRIPTION OF THE PREFERRED EMBODIMENTS

Hereinafter, embodiments of the present disclosure will be described with reference to the drawings.

First Embodiment

[Entire Configuration]

Figure 1:
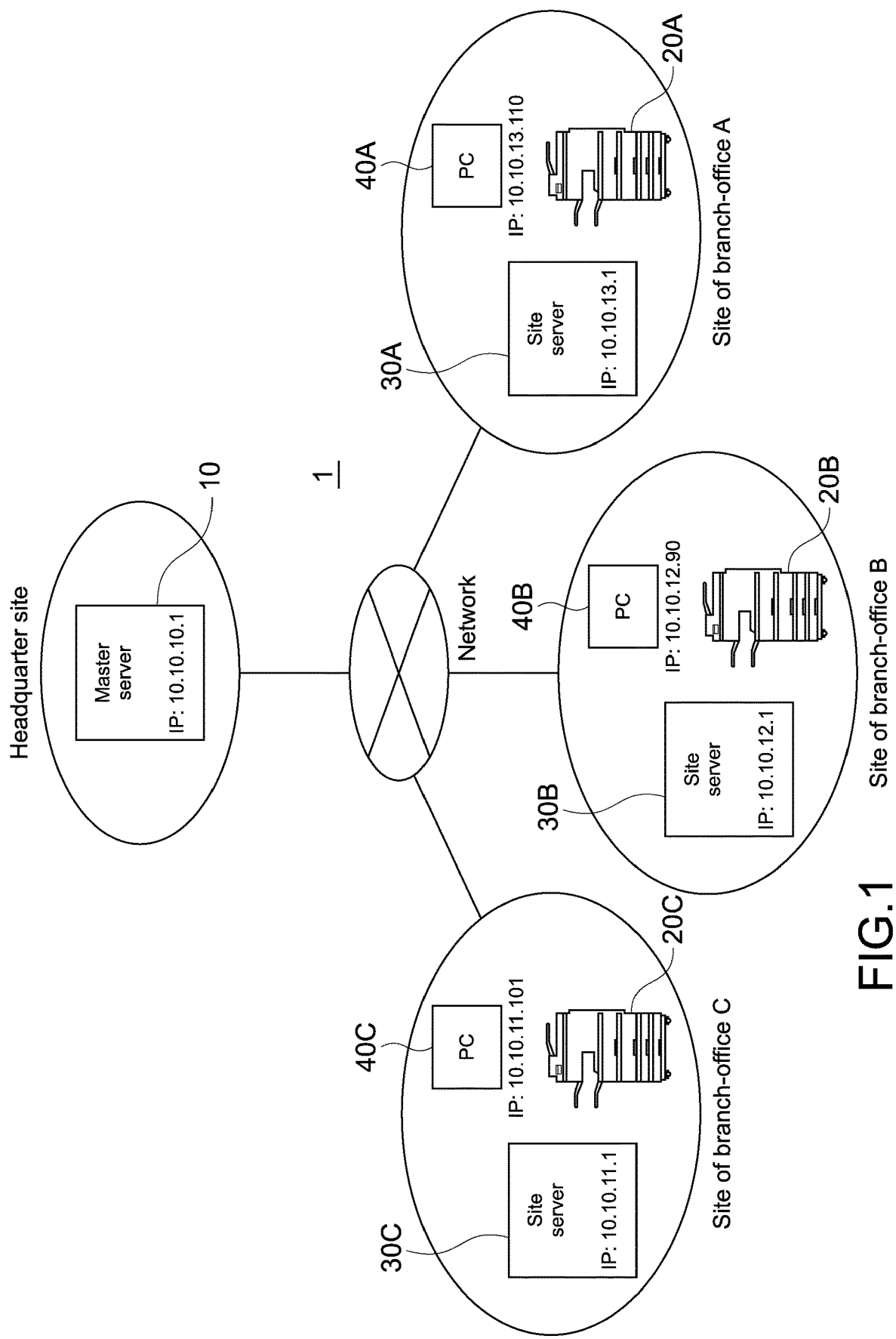
FIG. 1 illustrates an entire configuration of the information processing system 1 according to the first embodiment of the present disclosure.

Firstly, an entire configuration of the information processing system 1 according to a first embodiment of the present disclosure will be described. FIG. 1 illustrates an entire configuration of the information processing system 1 according to the first embodiment of the present disclosure.

As illustrated in the drawing, the information processing system 1 includes the master server 10 at a headquarter site, and the site servers 30A to 30C, the image forming apparatuses 20A to 20C, and the PCs 40A to 40C at the sites of the branch-offices A to C. Those apparatuses are connected via a network.

Note that, in the following, where it is not necessary to distinguish between the apparatuses at the respective branch-offices, they are referred to as the site server 30, the image forming apparatus 20, and the PC 40.

The master server 10 controls all the site servers 30A to 30C at the respective branch-office sites.

For example, at the site of the branch-office C, the PC 40C used by a user generates a print job in cooperation with the site server 30C. The generated print job is sent to and spooled by the site server 30C, and then printed by the image forming apparatus 20C. The same applies to the branch-offices A and B.

Different segments are allocated to the LANs (Local Area Networks) of the sites, respectively.

For example, the IP address of the master server at the headquarter site is 10.10.10.1. The IP address of the site server at the site of the branch-office C is 10.10.11.1.

The IP address of the PC 40A of the branch-office A is 10.10.13.110. However, where a user brings the PC 40A to the site of the branch-office C for a business trip and the PC 40A is connected to the network there, a new IP address 10.10.11.102 or the like is allocated to the PC 40A on the basis of DHCP (Dynamic Host Configuration Protocol).

An entire configuration of the information processing system 1 according to the first embodiment of the present disclosure has been described above.

[Processing Flow of the Present Embodiment]

Figure 2:
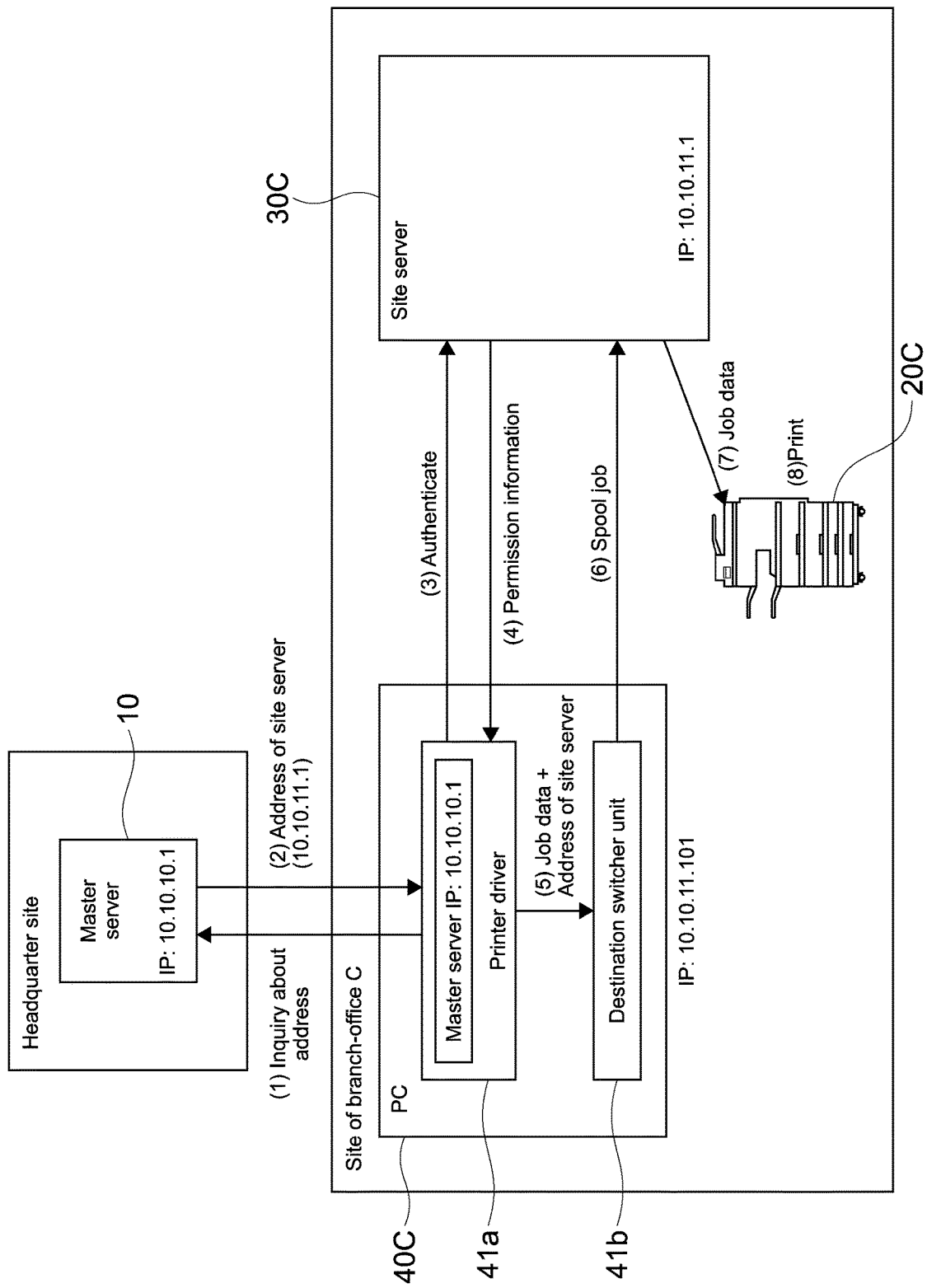
FIG. 2 schematically illustrates a processing flow of the present embodiment by illustrating the branch-office site C for an example.

Next, a processing flow of the present embodiment will be schematically described by illustrating the branch-office site C for an example. FIG. 2 schematically illustrates a processing flow of the present embodiment by illustrating the branch-office site C for an example.

In the present embodiment, in the PC 40C, the IP address of the master server 10 is configured only in the printer driver 41a.

A print job is generated as described in the following procedure:

(1) Firstly, the printer driver 41a of the PC 40 makes an inquiry to the master server 10 about the IP address of the site server to be in cooperation with the PC 40. This inquiry includes the IP address (for example, 10.10.11.101) of the PC 40.

(2) Next, the master server 10 at the headquarter site refers to the IP address mapping table 17a (described later) of the master server 10, and returns the IP address of the site server to be in cooperation with the PC 40 to the printer driver 41a.

(3) Next, the printer driver 41a obtains the IP address of the site server 30C to be in cooperation with the PC 40, and requests the site server 30C to authenticate a user.

(4) Where the site server 30C succeeds in authentication, the site server 30C provides permission information to the printer driver 41a.

(5) The printer driver 41a generates a print job on the basis of the provided permission information, embeds the IP address of the site server in job data, and sends the job data to the destination switcher unit 41b.

(6) The destination switcher unit 41b extracts the address of the site server 30C from the received print job, and then sends the job data to the site server 30C, which spools the job data.

(7) The site server 30C sends the spooled print job to the image forming apparatus 20C.

(8) The image forming apparatus 20C prints the print job.

As described above, according to the present embodiment, it is only necessary to set the IP address of the master server 10 only for the printer drivers of all the PCs of the information processing system 1. Therefore time and effort for setting configurations may be reduced to a large extent.

Note that, in the above-mentioned embodiment, the printer driver 41*a* provides the information about the address of the site server, which is embedded in the job data, to the destination switcher unit 41*b*.

This is because, for example, Windows (registered trademark) OS (Operating System) disables direct inter-process communication between the printer driver 41*a* and the destination switcher unit 41*b* (port monitor).

A processing flow of the present embodiment has been schematically described above by illustrating the branch-office site C for an example.

[IP Address Mapping Table]

Figure 3:

Next, the above-mentioned IP address mapping table 17*a* will be described. FIG. 3 illustrates an example of the IP address mapping table 17*a*.

The example of FIG. 3 illustrates that, where the IP addresses of the PCs at a branch-office site are in the range from 10.10.11.0 to 10.10.11.255, the IP address of the site server to be in cooperation with the PCs is 10.10.11.1.

In this manner, where a PC at a branch-office site makes an inquiry to the master server 10 about the address of the site server to be in cooperation with the PC with the IP address of the PC, the master server 10 searches the ranges of IP addresses of PCs, which are described at the right side of the IP address mapping table 17*a*, for the IP address of the PC. The master server 10 returns the IP address of the site server, which is described in the appropriate entry, to the PC.

The IP address mapping table 17*a* has been described above.

[Embedding IP Address of Site Server in Job Data]

Figure 4:
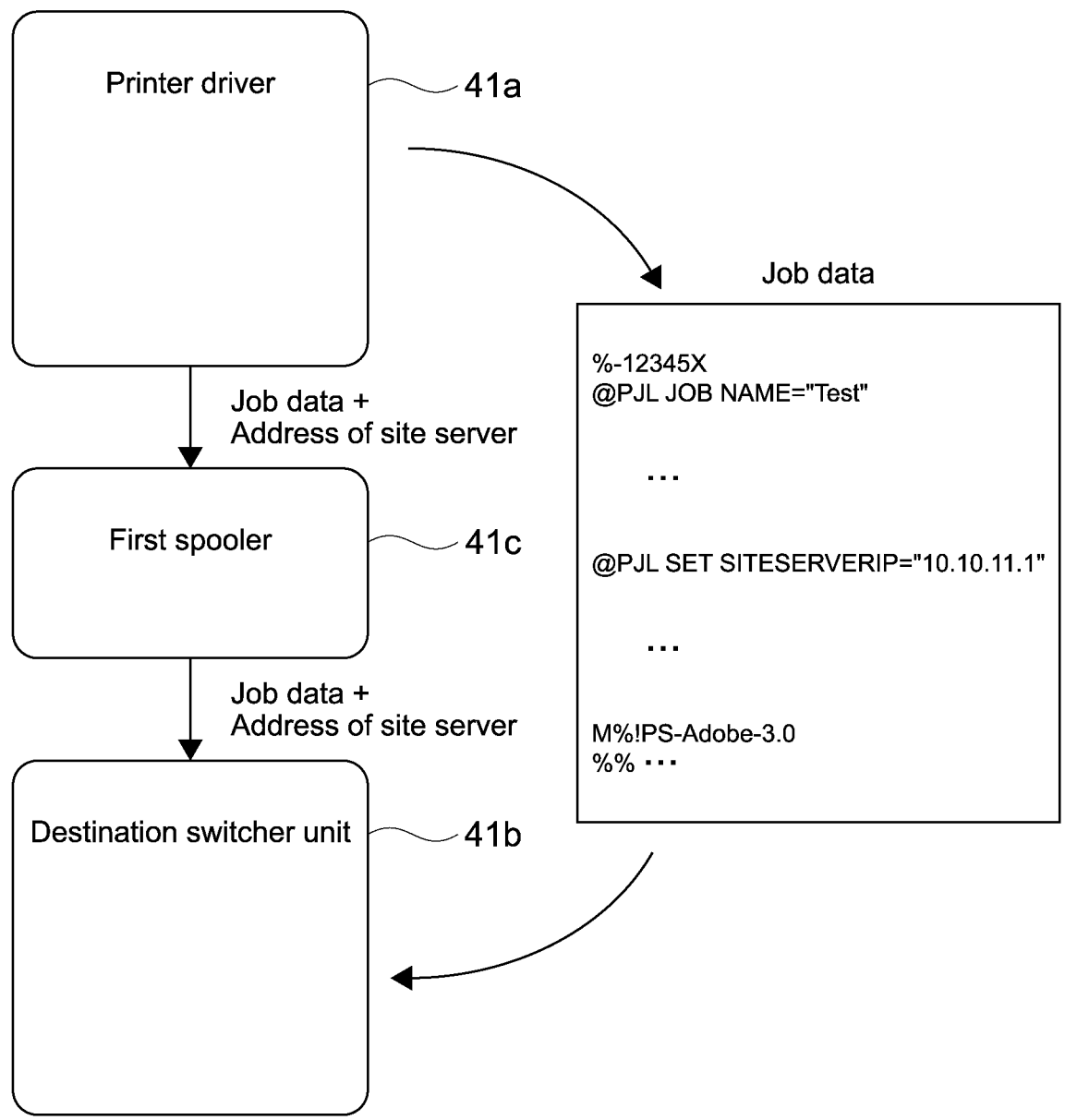
FIG. 4 illustrates a method of embedding the IP address of the site server in the job data.

Next, a method of embedding the IP address of the site server in the job data will be described. FIG. 4 illustrates a method of embedding the IP address of the site server in the job data.

As illustrated in the drawing, PJL (Printer Job Language) is used to embed the IP address of a site server in job data.

In this example, a PJL command (@PJL SET SITESERVERIP="10.10.11.1") is embedded in job data.

The printer driver 41*a*, i.e., an OS-standard spooler, outputs the job data, in which the IP address of the site server is embedded, to the first spooler 41*c*. The first spooler 41*c* supplies the job data to the destination switcher unit 41*b*.

A method of embedding the IP address of the site server in the job data has been described above.

[Configuration of Master Server]

Figure 5:
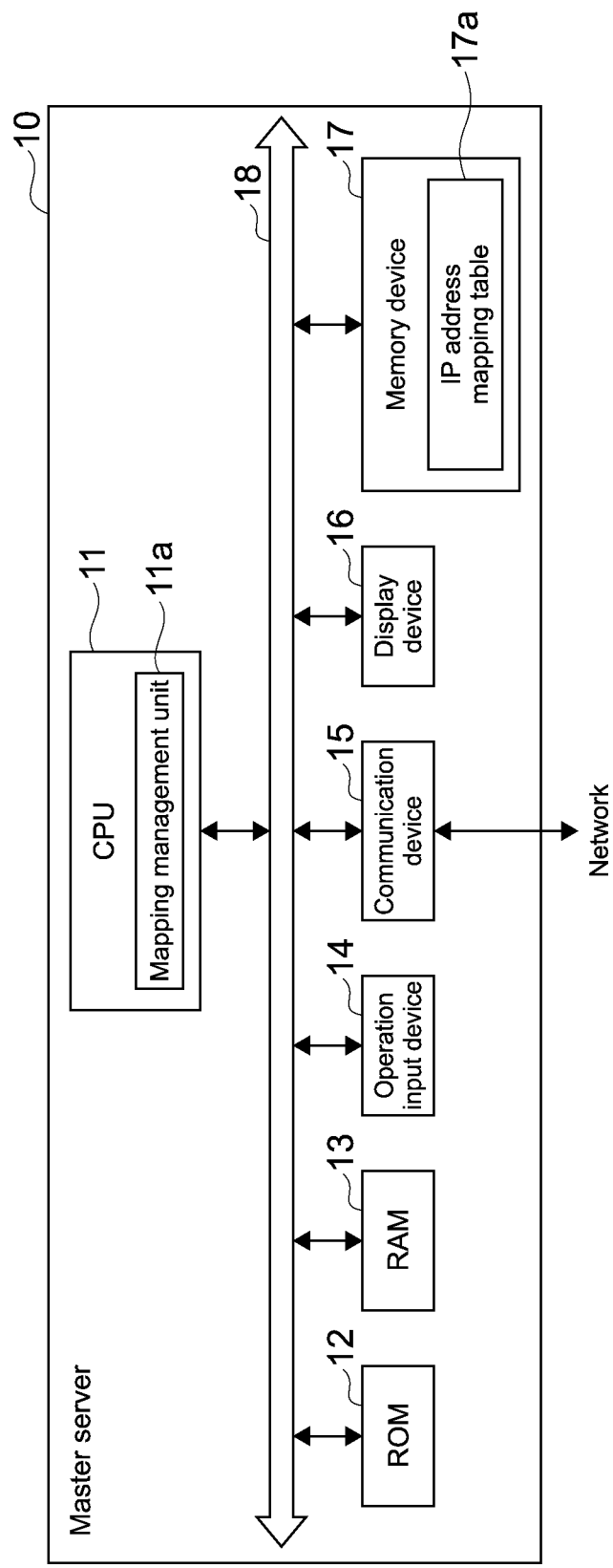
FIG. 5 illustrates a configuration of the master server 10, the master server 10 being a computer.

Next, a configuration of the master server 10 will be described. The master server 10 may include dedicated hardware and software, or may be a computer. FIG. 5 illustrates a configuration of the master server 10, the master server 10 being a computer.

As illustrated in the drawing, the master server 10 includes the CPU (Central Processing Unit) 11 (first processor), the ROM (Read Only Memory) 12 (first ROM), the RAM (Random Access Memory) 13, the operation input devices 14, the communication device 15 (first communication device), the display device 16, and the memory device 17 (first memory), which are connected to each other via the bus 18.

The ROM 12 stores a plurality of programs such as firmware and data used to execute various kinds of processing. The RAM 13 is used as a work area for the CPU 11, and temporarily stores the OS, various applications being executed, and various data being processed.

The memory device 17 is, for example, an HDD (Hard Disk Drive), a flash memory, or another nonvolatile memory. The memory device 17 stores the OS, various applications, various data, and the IP address mapping table 17*a*.

The communication device 15 is connected to the network in order to send and receive information to and from the PCs 40A to 40C and the site servers 30A to 30C.

In response to a command supplied from the operation input devices 14, the CPU 11 loads a corresponding program in the RAM 13 out of a plurality of programs stored in the ROM 12 and the memory device 17, and executes the loaded program to appropriately control the display device 16 and the memory device 17.

The operation input devices 14 include, for example, a pointing device such as a mouse, a keyboard, a touch panel, and other operation devices.

The display device 16 is, for example, a liquid crystal display, an EL (Electro-Luminescence) display, a plasma display, or the like.

The CPU 11 executes a program (first information processing program) to thereby realize a functional block, which will be described next.

The CPU 11 of the master server 10 realizes a functional block, i.e., the mapping management unit 11*a*.

The mapping management unit 11*a* returns, with respect to an IP address inquiry for the site server with the IP address of the PC, the address inquiry being sent from each of the PCs 40A to 40C at the branch-office sites, the IP address of the site server to be in cooperation with the PC with reference to the IP address mapping table 17*a*.

A configuration of the master server 10 has been described above.

[Configuration of Image Forming Apparatus]

Each of the image forming apparatuses 20A to 20C of the present embodiment may be a typical image forming apparatus, and the description thereof will be omitted.

[Configuration of Site Server]

Figure 6:
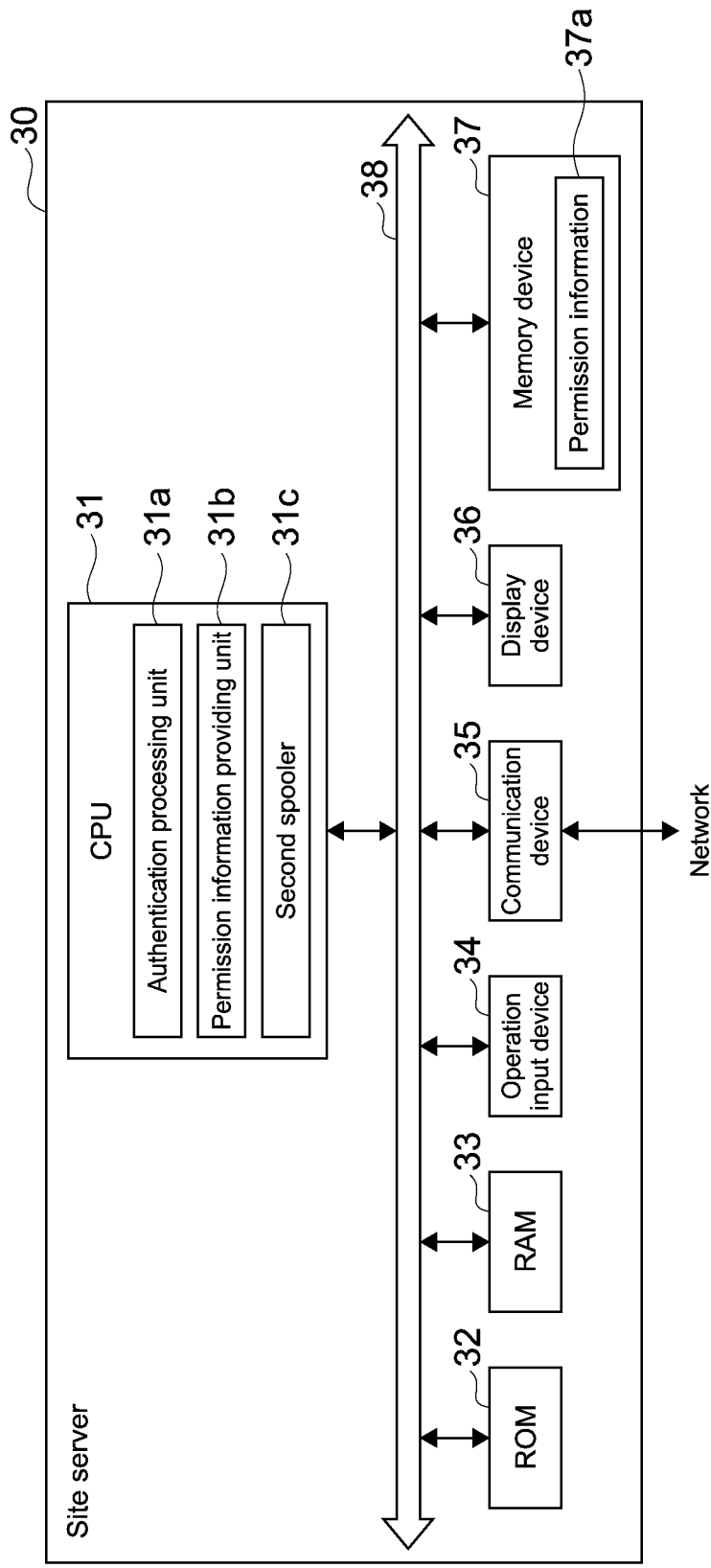
FIG. 6 illustrates a configuration of the site server 30, the site server 30 being a computer.

Next, a configuration of the site server 30 will be described. The site server 30 may include dedicated hardware and software, or may be a computer. FIG. 6 illustrates a configuration of the site server 30, the site server 30 being a computer.

As illustrated in the drawing, the site server 30 includes the CPU 31 (second processor), the ROM 32 (second ROM), the RAM 33, the operation input devices 34, the communication device 35 (second communication device), the display device 36, and the memory device 37 (second memory), which are connected to each other via the bus 38.

The ROM 32 stores a plurality of programs such as firmware and data used to execute various kinds of processing. The RAM 33 is used as a work area for the CPU 31, and temporarily stores the OS, various applications being executed, and various data being processed.

The memory device 37 is, for example, an HDD, a flash memory, or another nonvolatile memory. The memory device 37 stores the OS, various applications, various data, and the permission information 37*a*.

The permission information 37*a* is a list of functions of the image forming apparatus, use of the functions by each user being permitted. The printer driver of the PC refers to the permission information 37*a* when generating a job.

The communication device 35 is connected to the network in order to send and receive information to and from the image forming apparatus 20 and the master server 10.

In response to a command supplied from the operation input devices 34, the CPU 31 loads a corresponding program in the RAM 33 out of a plurality of programs stored in the ROM 32 and the memory device 37, and executes the loaded program to appropriately control the display device 36 and the memory device 37.

The operation input devices 34 include, for example, a pointing device such as a mouse, a keyboard, a touch panel, and other operation devices.

The display device 36 is, for example, a liquid crystal display, an EL display, a plasma display, or the like.

The CPU 31 executes a program (second information processing program) to thereby realize functional blocks, which will be described next.

The CPU 31 of the site server 30 realizes functional blocks including the authentication processing unit 31a, the permission information providing unit 31b, and the second spooler 31c.

The authentication processing unit 31a authenticates the user in response to an authentication request from the printer driver 41a.

The permission information providing unit 31b, when succeeding in authentication of the user, obtains the permission information corresponding to the user out of the permission information stored in the memory device 37, and provides the permission information to the printer driver 41a.

The second spooler 31c spools the print job sent from the destination switcher unit 41b, and then sends the print job to an appropriate image forming apparatus 20, which prints the print job.

A configuration of the site server 30 has been described above.

[Configuration of PC]

Figure 7:
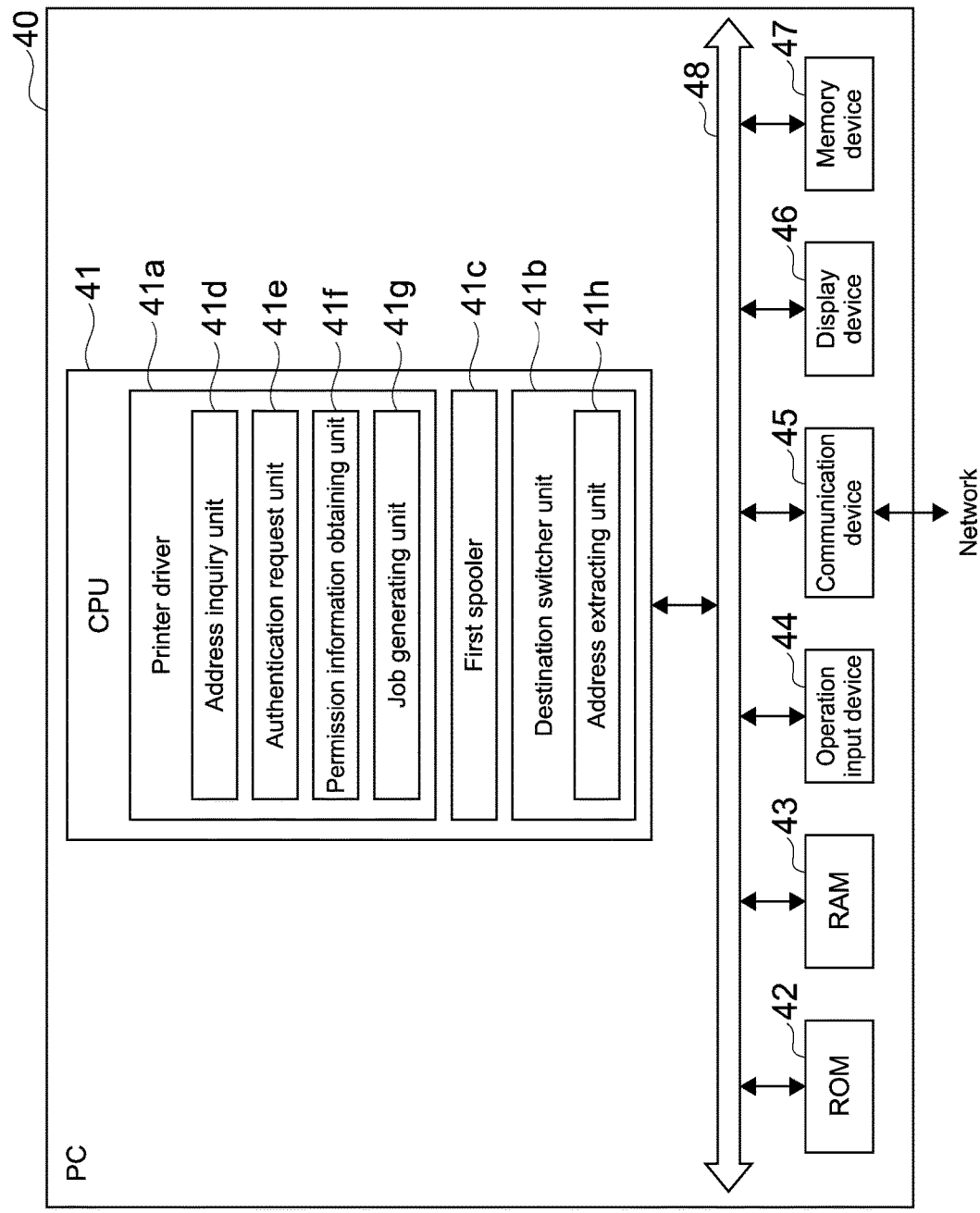
FIG. 7 illustrates a configuration of the PC 40, the PC 40 being a computer.

Next, a configuration of the PC 40 will be described. The PC 40 may include dedicated hardware and software, or may be a computer. FIG. 7 illustrates a configuration of the PC 40, the PC 40 being a computer.

As illustrated in the drawing, the PC 40 includes the CPU 41 (third processor), the ROM 42 (third ROM), the RAM 43, the operation input devices 44, the communication device 45 (third communication device), the display device 46, and the memory device 47 (third memory), which are connected to each other via the bus 48.

The ROM 42 stores a plurality of programs such as firmware and data used to execute various kinds of processing. The RAM 43 is used as a work area for the CPU 41, and temporarily stores the OS, various applications being executed, and various data being processed.

The memory device 47 is, for example, an HDD, a flash memory, or another nonvolatile memory. The memory device 47 stores the OS, various applications, and various data.

The communication device 45 is connected to the network in order to send and receive information to and from the image forming apparatus 20 and the master server 10.

In response to a command supplied from the operation input devices 44, the CPU 41 loads a corresponding program in the RAM 43 out of a plurality of programs stored in the ROM 42 and the memory device 47, and executes the loaded program to appropriately control the display device 46 and the memory device 47.

The operation input devices 44 include, for example, a pointing device such as a mouse, a keyboard, a touch panel, and other operation devices.

The display device 46 is, for example, a liquid crystal display, an EL display, a plasma display, or the like.

The CPU 41 executes a program (third information processing program) to thereby realize functional blocks, which will be described next.

The CPU 41 of the PC 40 realizes functional blocks including the printer driver 41a, the destination switcher unit 41b, and the first spooler 41c.

The printer driver 41a is a device driver that controls the image forming apparatus to execute a desired job, and includes the address inquiry unit 41d, the authentication request unit 41e, the permission information obtaining unit 41f, and the job generating unit 41g.

The destination switcher unit 41b is a so-called port monitor of Windows (registered trademark) OS, and switches the destination of the job generated by the printer driver 41a. The destination switcher unit 41b includes the address extracting unit 41h.

The first spooler 41c is the OS-standard spooler. The first spooler 41c spools the job generated by the printer driver 41a, and then supplies the job to the destination switcher unit 41b.

The address inquiry unit 41d makes an inquiry to the master server 10 about the IP address of the site server to be in cooperation with the PC 40 by using the IP address of the master server 10 configured in the printer driver 41a.

The authentication request unit 41e requests the site server 30, which has the IP address that the address inquiry unit 41d obtains from the master server 10, to authenticate the user, who instructs to generate a job.

The permission information obtaining unit 41f obtains the permission information of the authenticated user where the site server 30, to which the authentication request unit 41e outputs the authentication request, succeeds in authentication.

The job generating unit 41g generates the job, which is to be executed by the image forming apparatus 20, on the basis of the permission information obtained by the permission information obtaining unit 41f. Note that the job generating unit 41g embeds the IP address of the site server 30 in the generated job data.

The address extracting unit 41h extracts the IP address of the site server 30 from the job data in which the IP address of the site server 30 is embedded.

A configuration of the PC 40 has been described above.

[Detailed Processing Flow (Presetting)]

Figure 8:
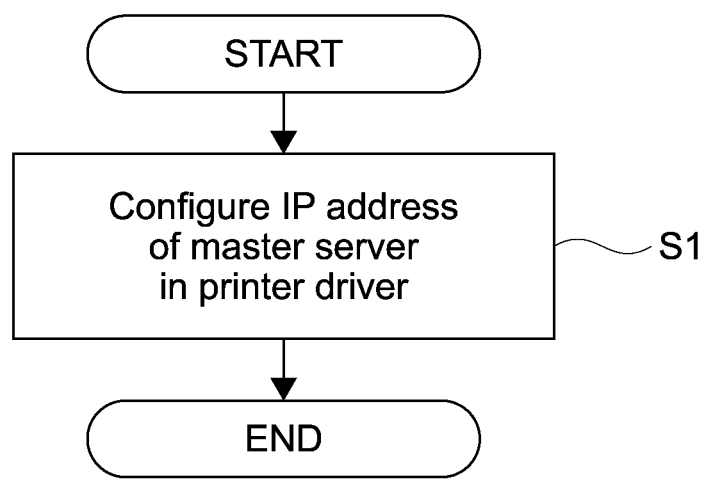
FIG. 8 illustrates a processing flow (presetting) of the information processing system 1.

Next, a processing flow (presetting) of the information processing system 1 will be described. FIG. 8 illustrates a processing flow (presetting) of the information processing system 1.

Firstly, the IP address of the master server 10 is configured in the printer driver 41a of each of the PCs 40 of each of the branch-office sites instructed by a user or by a deployment tool (Step S1).

A processing flow (presetting) of the information processing system 1 has been described above.

[Detailed Processing Flow (When Generating Job)]

Figure 9:
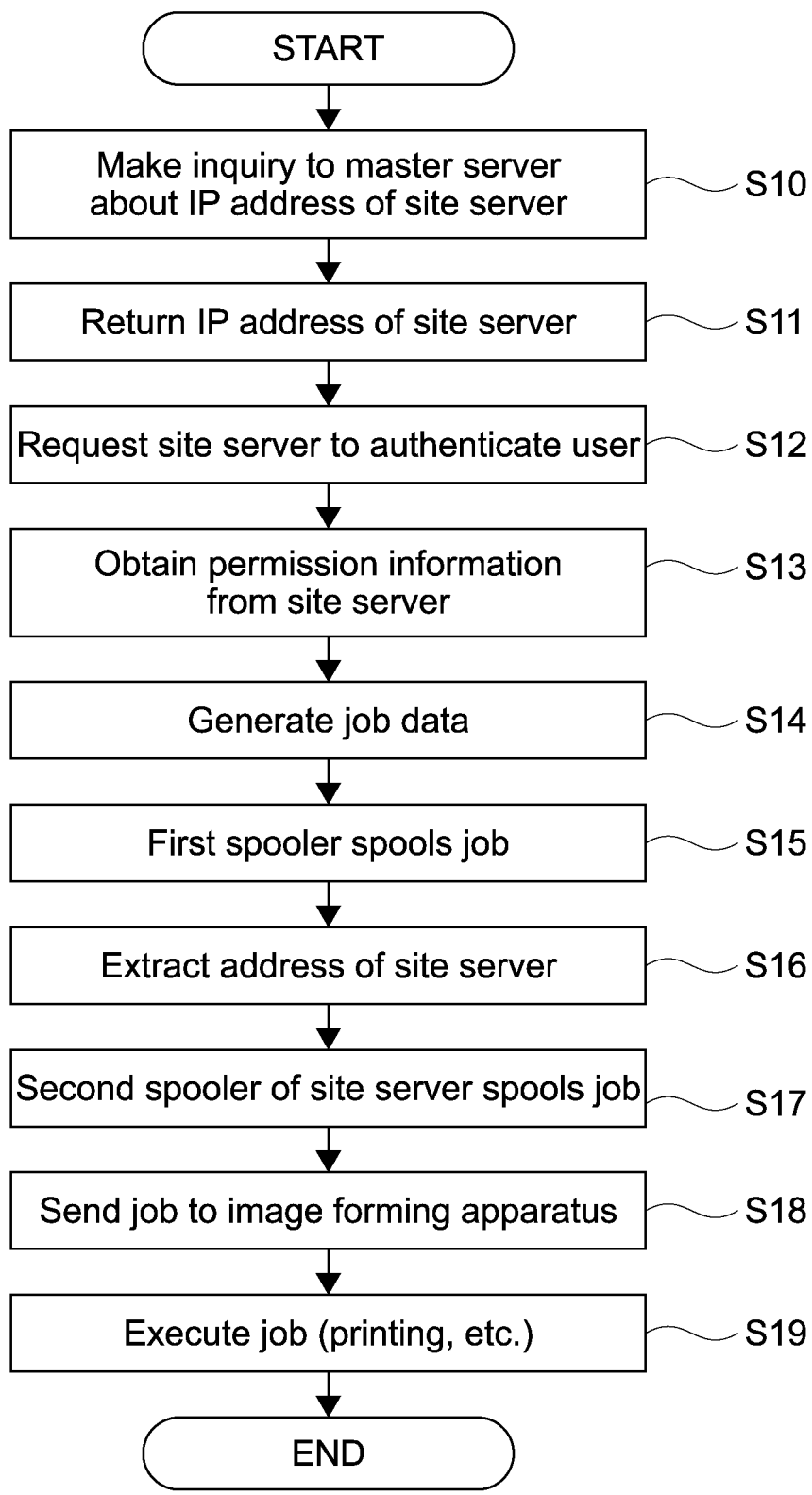
FIG. 9 illustrates a processing flow of the information processing system 1 when receiving a job generation instruction from a user.

Next, a processing flow of the information processing system 1 when receiving a job generation instruction from a user will be described. FIG. 9 illustrates a processing flow of the information processing system 1 when receiving a job generation instruction from a user.

Firstly, the address inquiry unit 41d of the PC 40 makes an inquiry to the mapping management unit 11a of the master server 10 about the IP address of the site server 30 to be in cooperation with the PC 40 with the IP address of the PC 40 by using the IP address of the master server 10 configured in the PC 40 (Step S10).

Next, with reference to the IP address mapping table 17a, the mapping management unit 11a returns the IP address of the site server 30 corresponding to the IP address used for the inquiry (Step S11).

Next, the authentication request unit 41e of the PC 40 requests the authentication processing unit 31a of the site server 30 to authenticate the user by using the IP address of the returned site server 30 (Step S12).

Next, the authentication processing unit 31a returns the result of the authentication process to the PC 40. In addition, where the authentication processing unit 31a succeeds in authentication, the permission information providing unit 31b returns the permission information 37a of the authenticated user to the PC 40. The permission information obtaining unit 41f of the PC 40 obtains the returned permission information 37a (Step S13).

Next, the job generating unit 41g of the PC 40 generates job data on the basis of the obtained permission information 37a, and embeds the IP address of the site server 30 in the job data (Step S14).

Next, the first spooler 41c spools the job data generated by the job generating unit 41g (Step S15).

Next, the address extracting unit 41h of the PC 40 extracts the IP address of the site server 30 from the job data from the first spooler 41c (Step S16).

Next, the destination switcher unit 41b of the PC 40 sends, on the basis of the extracted IP address of the site server 30, the job data from the first spooler 41c to the second spooler 31c of the site server 30, which spools the job data (Step S17).

Next, the second spooler 31c of the site server 30 sends the spooled job data to the appropriate image forming apparatus 20 (Step S18).

Next, the image forming apparatus 20 executes the job such as a print job on the basis of the received job data (Step S19).

A processing flow of the information processing system 1 when generating a job has been described above.

The first embodiment has been described above.

Second Embodiment

Next, a second embodiment will be described. In the first embodiment, the IP address of the master server 10 is configured only in the printer driver 41a, and thereby the printer driver 41a and the destination switcher unit 41b are capable of accessing the site server 30 to be in cooperation with the PC 40 when generating a job. This method will be hereinafter referred to as the automatic-detection-mode of the site server 30.

According to a method of the second embodiment to be described, time and effort when the information processing system 1 executes the automatic-detection-mode is further reduced.

Where the automatic-detection-mode is used, according to the configuration of the first embodiment, it is necessary to turn on the configurations of the automatic-detection-mode for the printer driver 41a and the destination switcher unit 41b.

A user sets the configurations of the two independent modules, i.e., the printer driver 41a and the destination switcher unit 41b. However, for example, an inexperienced user may turn on the automatic-detection-mode configuration for one module, and forget to turn on the automatic-detection-mode for the other module.

If the automatic-detection-mode is turned on for one module and turned off for the other module (different on-and-off configuration), the automatic-detection-mode may not be executed appropriately.

In view of the above, according to a conceivable configuration of the second embodiment, when a user turns on the automatic-detection-mode configuration only for the printer driver 41a, the configuration is transmitted to the destination switcher unit 41b, and the automatic-detection-mode configuration is automatically turned on also for the destination switcher unit 41b.

[Outline]

Next, the outline of the process of transmitting the automatic-detection-mode configuration in the PC 40 will be described.

When the automatic-detection-mode configuration is turned on for the printer driver 41a instructed by a user, the printer driver 41a stores a flag in a specific location of the registry, the flag indicating that the automatic-detection-mode is turned on.

The destination switcher unit 41b is also capable of referring to the specific location of the registry. Before executing the operation about the automatic-detection-mode, the destination switcher unit 41b refers to the specific location of the registry, and confirms whether the automatic-detection-mode is turned on or not. After confirmation, the destination switcher unit 41b executes the operation corresponding to the on-and-off status of the automatic-detection-mode.

Note that the operation about the automatic-detection-mode includes, for example, where the automatic-detection-mode is turned on, the operation in which the destination switcher unit 41b extracts the IP address of the site server 30 from the job data received via the first spooler 41c, the operation in which the destination switcher unit 41b disables setting of the IP address of the site server 30 in a UI (User Interface) window for a user, or the like.

Figure 10:
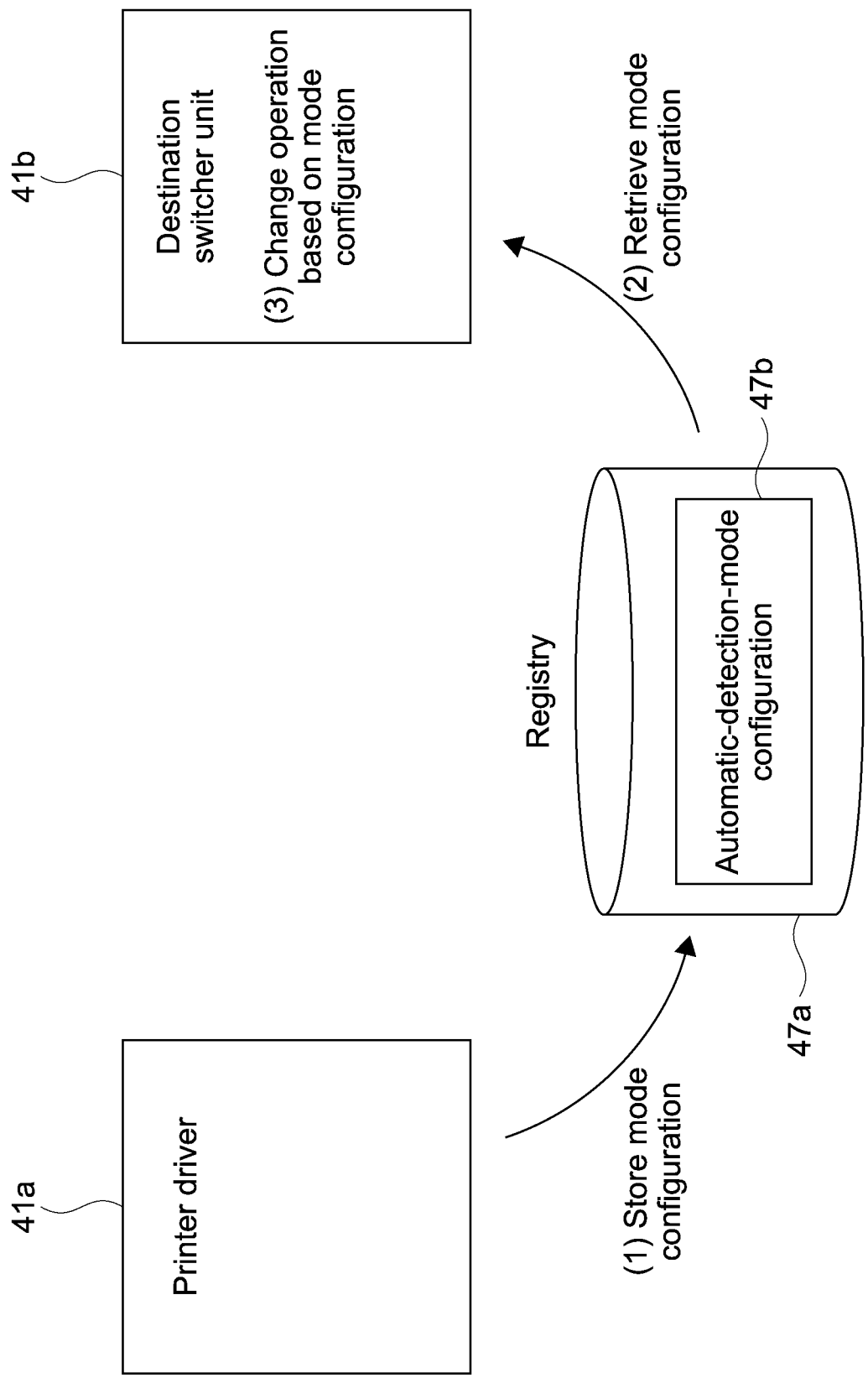
FIG. 10 illustrates that, in the second embodiment of the present disclosure, the printer driver 41a stores the automatic-detection-mode configuration in the specific location of the registry of the memory device 47, and the destination switcher unit 41b retrieves the configuration.

FIG. 10 illustrates that, in the second embodiment of the present disclosure, the printer driver 41a stores the automatic-detection-mode configuration in the specific location of the registry of the memory device 47, and the destination switcher unit 41b retrieves the configuration.

Note that the processing is executed as described in the following procedure:

(1) The printer driver 41a stores the automatic-detection-mode configuration in the specific location of the registry 47a. Note that the stored information may include not only information of the on-and-off status of the automatic-detection-mode, but also various information about the automatic-detection-mode, for example, the name of the destination switcher unit 41b and the like.

(2) Before executing the operation about the automatic-detection-mode, the destination switcher unit 41b retrieves the automatic-detection-mode configuration from the specific location of the registry 47a.

(3) The destination switcher unit 41b changes the operation about the automatic-detection-mode on the basis of the retrieved automatic-detection-mode configuration.

The outline of the process of transmitting the automatic-detection-mode configuration in the PC 40 has been described above.

[Configuration of PC]

Figure 11:
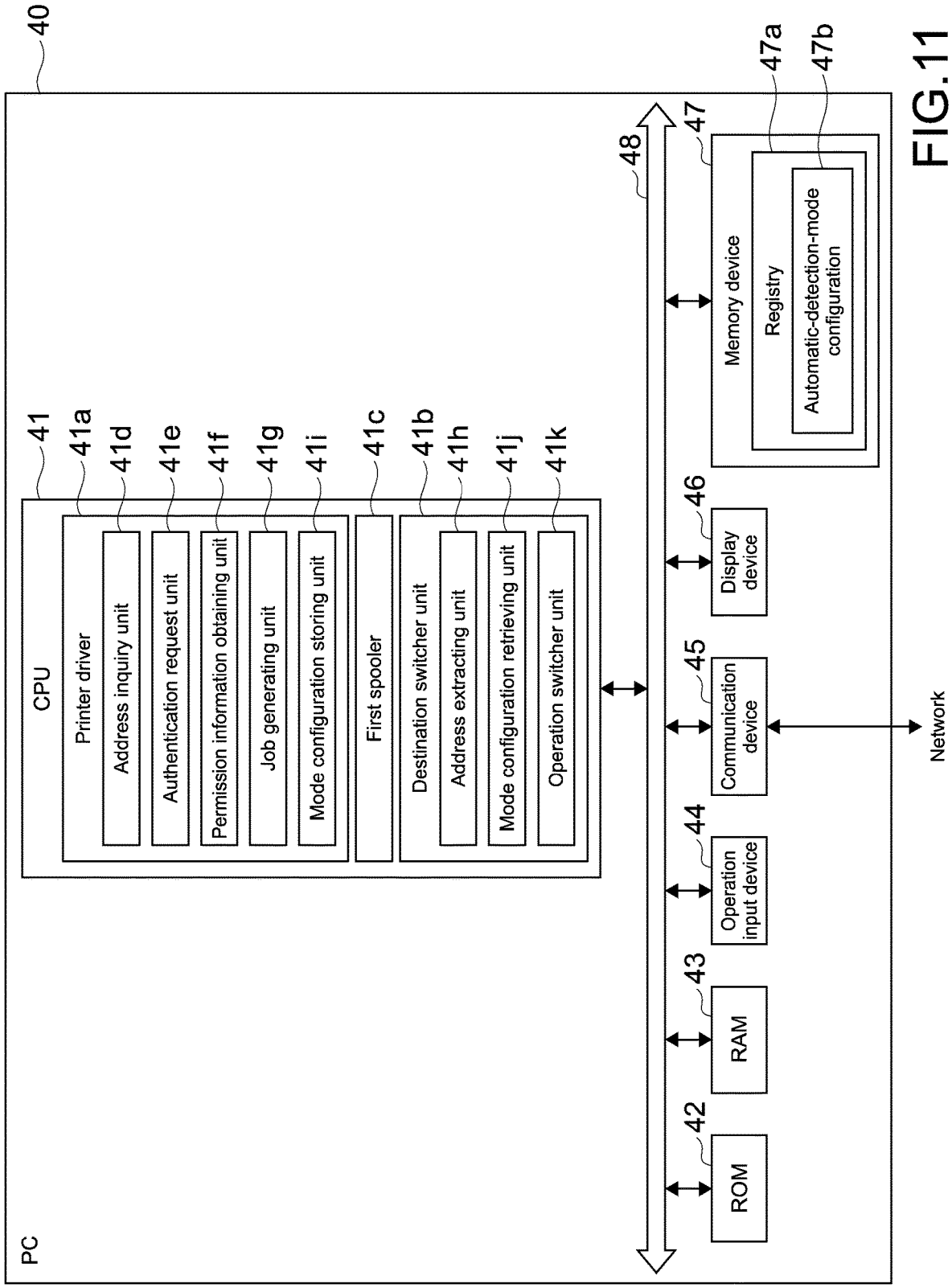
FIG. 11 illustrates a configuration of the PC 40, the PC 40 being a computer.

Next, a configuration of the PC 40 will be described. The PC 40 may include dedicated hardware and software, or may be a computer. FIG. 11 illustrates a configuration of the PC 40, the PC 40 being a computer.

As illustrated in the drawing, the PC 40 includes the CPU 41 (third processor), the ROM 42 (third ROM), the RAM 43, the operation input devices 44, the communication device 45 (third communication device), the display device 46, and the memory device 47 (third memory), which are connected to each other via the bus 48.

The ROM 42 stores a plurality of programs such as firmware and data used to execute various kinds of processing. The RAM 43 is used as a work area for the CPU 41, and temporarily stores the OS, various applications being executed, and various data being processed.

The memory device 47 is, for example, an HDD, a flash memory, or another nonvolatile memory. The memory device 47 stores the OS, various applications, various data, and the registry 47a.

The registry 47a stores variables for various programs that the CPU 41 executes. In the present embodiment, the registry 47a stores the automatic-detection-mode configuration 47b.

The communication device 45 is connected to the network in order to send and receive information to and from the image forming apparatus 20 and the master server 10.

In response to a command supplied from the operation input devices 44, the CPU 41 loads a corresponding program in the RAM 43 out of a plurality of programs stored in the ROM 42 and the memory device 47, and executes the loaded program to appropriately control the display device 46 and the memory device 47.

The operation input devices 44 include, for example, a pointing device such as a mouse, a keyboard, a touch panel, and other operation devices.

The display device 46 is, for example, a liquid crystal display, an EL display, a plasma display, or the like.

The CPU 41 executes a program (third information processing program) to thereby realize functional blocks, which will be described next.

The CPU 41 of the PC 40 realizes functional blocks including the printer driver 41a, the destination switcher unit 41b, and the first spooler 41c.

The printer driver 41a is a device driver that controls the image forming apparatus to execute a desired job, and includes the address inquiry unit 41d, the authentication request unit 41e, the permission information obtaining unit 41f, the job generating unit 41g, and the mode configuration storing unit 41i.

The destination switcher unit 41b is a so-called port monitor of Windows (registered trademark) OS, and switches the destination of the job generated by the printer driver 41a. The destination switcher unit 41b includes the address extracting unit 41h, the mode configuration retrieving unit 41j, and the operation switcher unit 41k.

The first spooler 41c, the address inquiry unit 41d, the authentication request unit 41e, the permission information obtaining unit 41f, the job generating unit 41g, and the address extracting unit 41h are the same as those of the first embodiment, and description thereof will be omitted.

The mode configuration storing unit 41i stores the configuration about the automatic-detection-mode in the registry 47a.

The mode configuration retrieving unit 41j retrieves the configuration about the automatic-detection-mode from the registry 47a as necessary.

The operation switcher unit 41k switches the operation of the destination switcher unit 41b on the basis of the automatic-detection-mode configuration 47b retrieved from the registry 47a.

A configuration of the PC 40 has been described above.

[Processing Flow]

Figure 12:
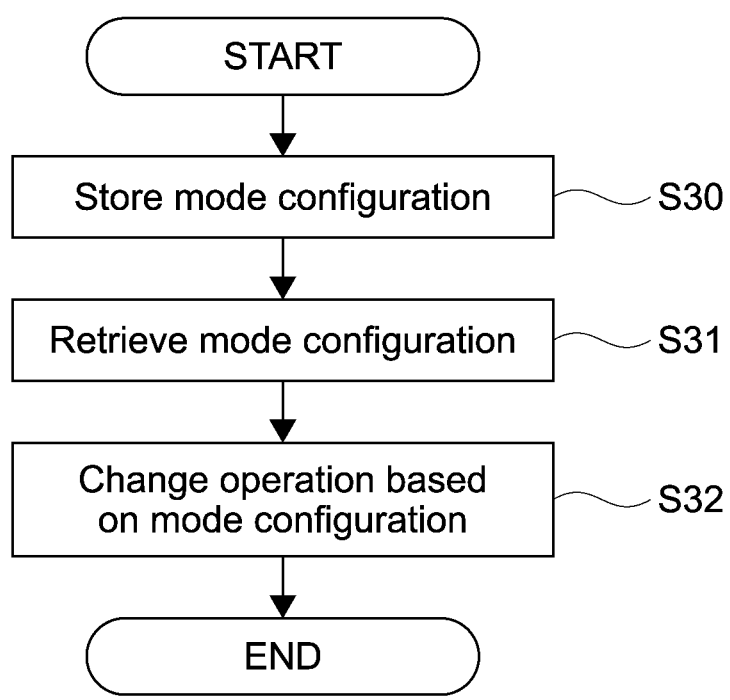
FIG. 12 illustrates a processing flow of transmitting the automatic-detection-mode configuration in the PC 40 of the information processing system 1.

Next, a processing flow of transmitting the automatic-detection-mode configuration in the PC 40 of the information processing system 1 will be described. FIG. 12 illustrates a processing flow of transmitting the automatic-detection-mode configuration in the PC 40 of the information processing system 1.

Firstly, the mode configuration storing unit 41i of the printer driver 41a stores the automatic-detection-mode configuration 47b in the registry 47a (Step S30).

Next, the mode configuration retrieving unit 41j of the destination switcher unit 41b retrieves the automatic-detection-mode configuration 47b from the registry 47a (Step S31).

Next, the operation switcher unit 41k of the destination switcher unit 41b switches the operation of the destination switcher unit 41b on the basis of the automatic-detection-mode configuration 47b retrieved from the registry 47a (Step S32).

A processing flow of transmitting the automatic-detection-mode configuration in the PC 40 of the information processing system 1 has been described above.

[Notes]

According to a conceivable technique, for example, when a client terminal sends data, a management server receives status data of the client terminal via a data relay device that relays communication data in a network. The management server permits to relay the data sent from the client terminal only when the status of the client terminal reaches a standard. Accordingly, the management server is capable of exchanging data with the client terminal while confirming that the status such as antivirus and security management of the client terminal reaches the standard.

Further, according to another conceivable technique, for example, a server stores permission information (information of function of image forming apparatus permitted to use) for each user. An image forming apparatus or a PC logs in to the server, then obtains appropriate permission information, and generates and executes a permitted job on the basis of the obtained permission information. For example, where a user is not permitted to use full-color printing, under his print instruction, all the image forming apparatuses connected to the network are only capable of executing black-and-white printing. In this manner, the print policy for each user is applied to all the image forming apparatuses connected to the network.

According to the latter technique, when a PC generates a print job, a printer driver obtains permission information from a server, and generates a job on the basis of the obtained permission information.

Further, where a large-scale organization uses image forming apparatuses, instead of one server obtaining permission information, a master server at a headquarter and site servers at branch-offices obtain permission information.

In this case, typically, the IP address of the site server at a branch-office is configured in printer drivers of PCs at the same branch-office, one by one, which costs time and effort.

Further, where a user at one branch-office brings a PC to another branch-office for a business trip, he has to reset the IP address of the site server manually.

To the contrary, according to the present embodiment, time and effort for setting configurations to PCs may be reduced, and mis-configurations may be reduced.

According to the present embodiment, once configuration of the IP address of the master server is set, a PC is capable of obtaining permission information from an appropriate site server and generating a job irrespective of a branch-office to which the PC belongs.

Note that, in the above description, the PC 40 uses the IP address to communicate with the site server 30. Instead of the IP address, the PC 40 may use the host name of the site server 30.

Third Embodiment

Hereinafter, hardware configuration and functional configuration similar to those of the first and second embodiments are denoted by the same or similar reference symbols, and description thereof will be omitted.

[Entire Configuration]

Figure 13:
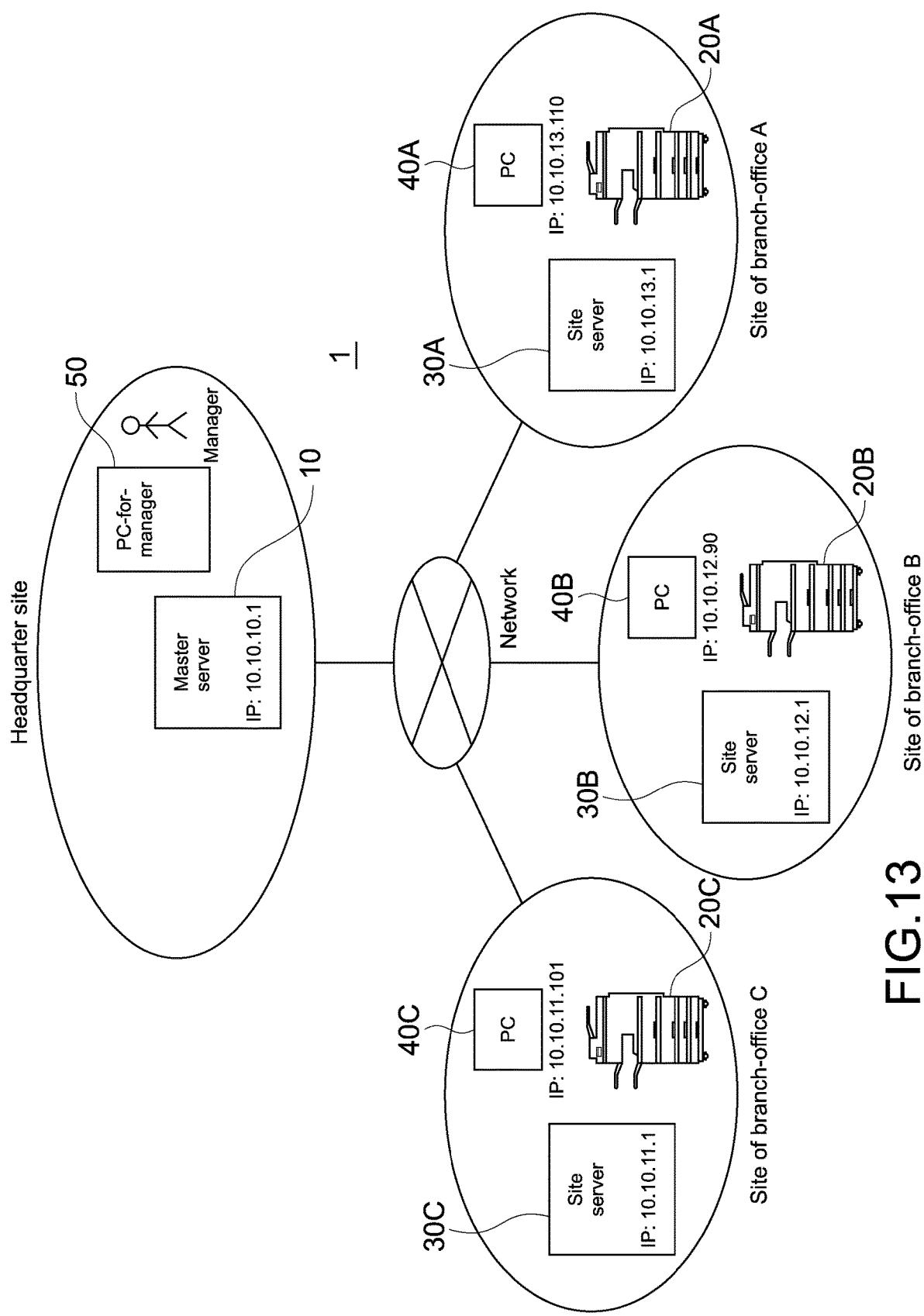
FIG. 13 illustrates an entire configuration of the information processing system 1 according to the third embodiment of the present disclosure.

Firstly, an entire configuration of the information processing system 1 according to a third embodiment of the present disclosure will be described. FIG. 13 illustrates an entire configuration of the information processing system 1 according to the third embodiment of the present disclosure.

Note that the PC-for-manager 50 used by a manager is at a headquarter site. The PC-for-manager 50 used by a manager accesses the master server 10.

An entire configuration of the information processing system 1 according to a third embodiment of the present disclosure has been described above.

[Outline of Processing]

Figure 14:
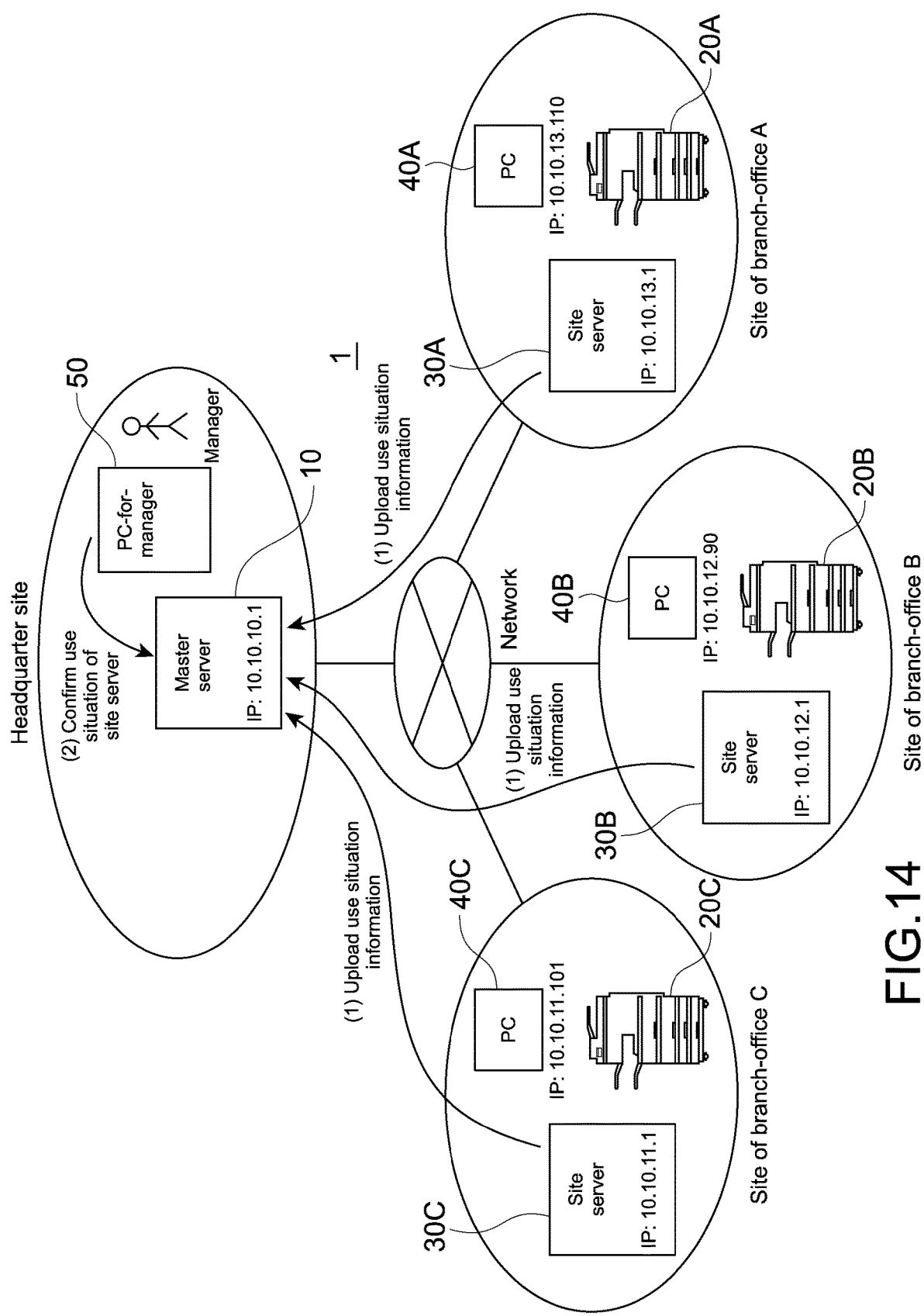
FIG. 14 illustrates an outline of processing of the information processing system 1.

Next, an outline of processing of the information processing system 1 will be described. FIG. 14 illustrates an outline of processing of the information processing system 1.

The processing is executed as described in the following procedure:

(1) Firstly, the site server 30 at each branch-office site uploads information of use situation of the site server to the master server 10. Note that the master server 10 stores the uploaded use situation information of the site server 30.

(2) Next, the PC-for-manager 50 used by a manager accesses the master server 10, and the manager confirms the use situation of each site server.

Note that the use situation information includes, for example, user accounting information such as counter information, billing information, and use time information about each user who instructs printing via the site server 30, device information and device counter information about the image forming apparatus 20, job information about printed jobs, and the like.

An outline of processing of the information processing system 1 has been described above.

[Configuration of Master Server]

Figure 15:
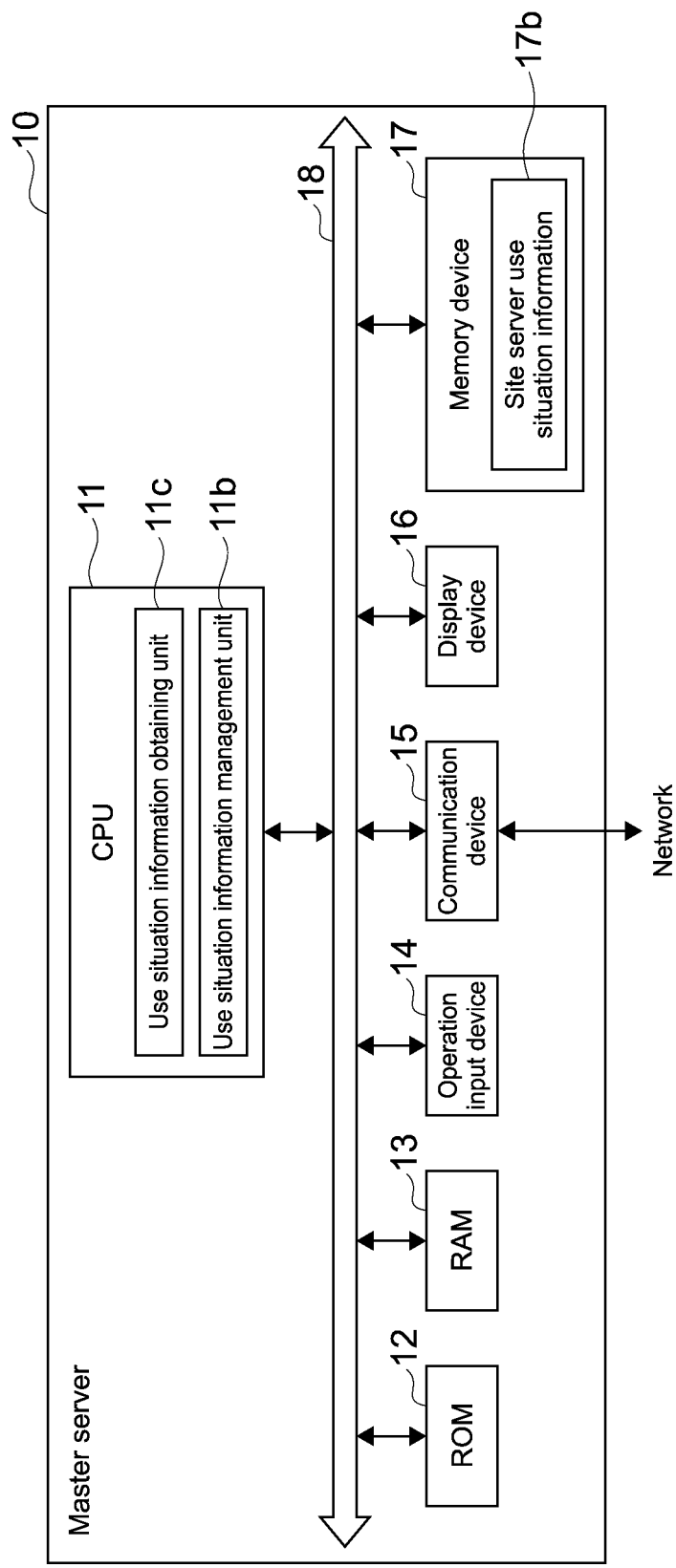
FIG. 15 illustrates a configuration of the master server 10, the master server 10 being a computer.

Next, a configuration of the master server 10 will be described. The master server 10 may include dedicated hardware and software, or may be a computer. FIG. 15 illustrates a configuration of the master server 10, the master server 10 being a computer.

The memory device 17 (first memory) is, for example, an HDD (Hard Disk Drive), a flash memory, or another nonvolatile memory. The memory device 17 stores the OS, various applications, various data, and the site server use situation information 17b.

The communication device 15 (first communication device) is connected to the network in order to send and receive information to and from the PC-for-manager 50, the PCs 40A to 40C, and the site servers 30A to 30C.

The CPU 11 (first processor) executes a program (first information processing program) to thereby realize functional blocks, which will be described next.

The CPU 11 of the master server 10 realizes functional blocks including the use situation information obtaining unit 11c and the use situation information management unit 11b.

The use situation information obtaining unit 11c obtains use situation information of the site server 30 provided from each site server 30, and stores the use situation information in the memory device 17.

In response to a use situation inquiry about the site server 30 from the PC-for-manager 50 used by a manager, the use situation information management unit 11b obtains the use situation information stored in the memory device 17, and provides the use situation information to the PC-for-manager 50.

A configuration of the master server 10 has been described above.

[Configuration of Site Server]

Figure 16:
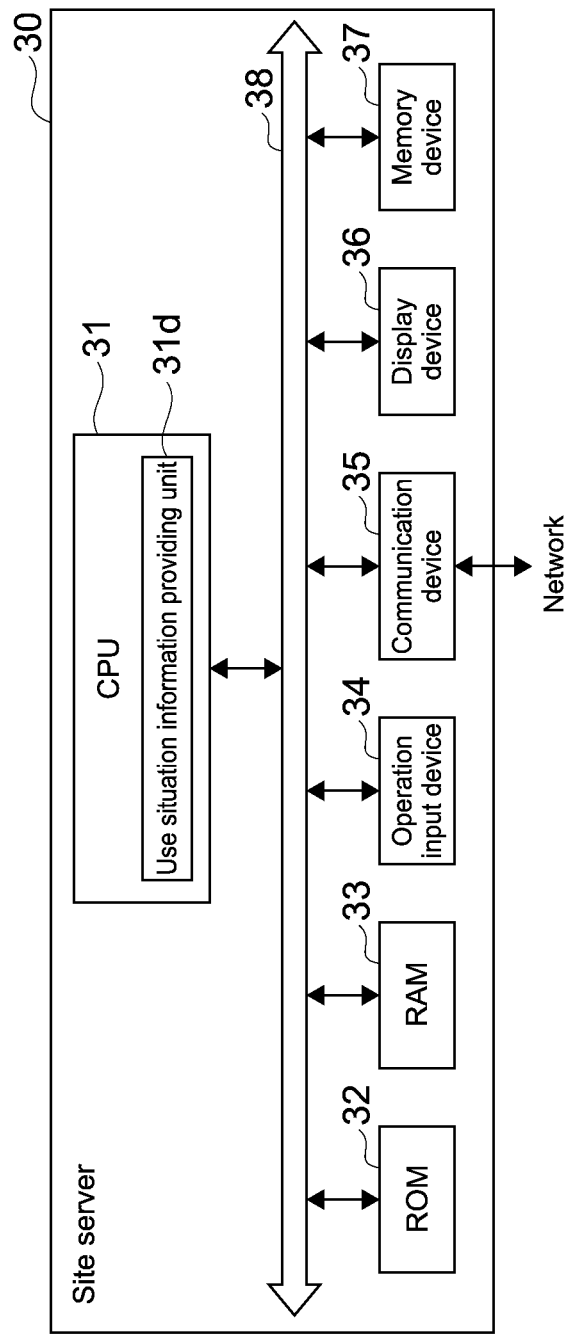
FIG. 16 illustrates a configuration of the site server 30, the site server 30 being a computer.

Next, a configuration of the site server 30 will be described. The site server 30 may include dedicated hardware and software, or may be a computer. FIG. 16 illustrates a configuration of the site server 30, the site server 30 being a computer.

The CPU 31 (second processor) executes a program (second information processing program) to thereby realize a functional block, which will be described next.

The CPU 31 of the site server 30 realizes a functional block, i.e., the use situation information providing unit 31d.

The use situation information providing unit 31d, at regular intervals or as necessary, collects use situation information about the site server 30 itself locally, and provides (uploads) the use situation information to the use situation information obtaining unit 11c of the master server 10.

A configuration of the site server 30 has been described above.

[Processing Flow (Collecting Use Situation Information)]

Figure 17:
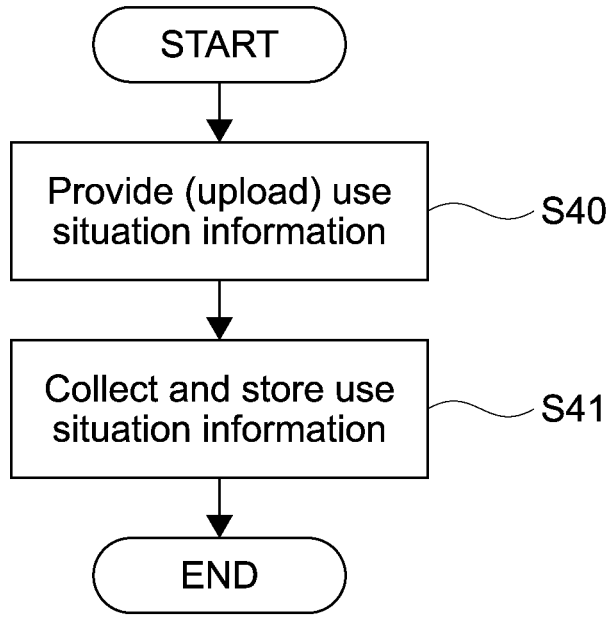
FIG. 17 illustrates a detailed processing flow of collecting use situation information of the site server 30 of the information processing system 1.

Next, a detailed processing flow of collecting use situation information of the site server 30 of the information processing system 1 will be described. FIG. 17 illustrates a detailed processing flow of collecting use situation information of the site server 30 of the information processing system 1.

Firstly, the use situation information providing unit 31d of each site server 30 collects the use situation information locally, and provides (uploads) the use situation information to the use situation information obtaining unit 11c of the master server 10 (Step S40).

Next, the use situation information obtaining unit 11c collects the use situation information uploaded by each site server 30, and stores the use situation information in the memory device 17 (Step S41).

A detailed processing flow of collecting use situation information of the site server 30 of the information processing system 1 has been described above.

[Processing Flow (Confirming Use Situation)]

Figure 18:
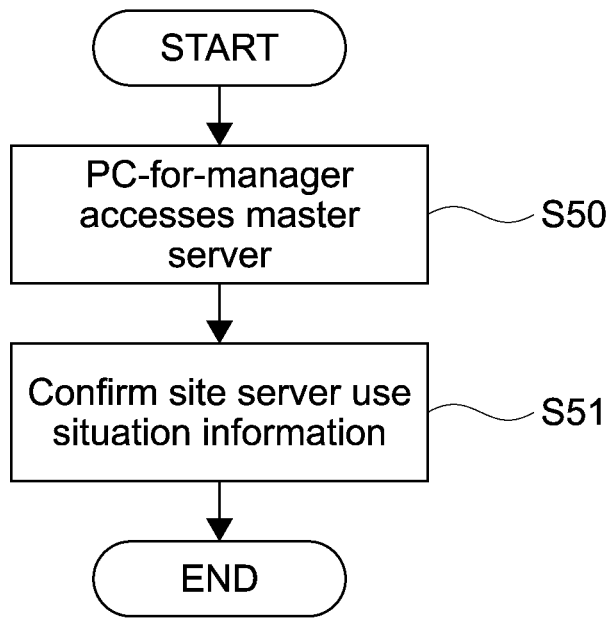
FIG. 18 illustrates a detailed processing flow of confirming the use situation of the site server 30 of the information processing system 1.

Next, a detailed processing flow of confirming the use situation of the site server 30 of the information processing system 1 will be described. FIG. 18 illustrates a detailed processing flow of confirming the use situation of the site server 30 of the information processing system 1.

Firstly, the PC-for-manager 50 used by a manager accesses the master server 10, and requests to confirm use situation of the site server 30 (Step S50).

Next, the use situation information management unit 11b obtains the site server use situation information 17b stored in the memory device 17, and provides the site server use situation information 17b to the manager (Step S51).

A detailed processing flow of confirming the use situation of the site server 30 of the information processing system 1 has been described above.

[Notes]

According to the above-mentioned conceivable technique, typically, a manager has to remotely log in to each site server and confirm use situation of the site server, which costs time and effort.

To the contrary, according to the present embodiment, a manager may confirm use situation of each site server only by logging in to the master server.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
a master server at a headquarter site;
an image forming apparatus at a branch-office site;
a site server at the branch-office site; and
a personal computer at the branch-office site, wherein
the master server includes
   a first ROM (Read Only Memory) that stores a first information processing program,
   a first processor that executes the first information processing program, and
   a first communication device capable of communicating with the site server and the personal computer,
the first processor executes the first information processing program to function as
   a mapping management unit that returns, with respect to an address inquiry request for the site server to be in cooperation with the personal computer, the address inquiry request being sent from the personal computer, an IP address of the site server to be in cooperation with the personal computer that sent the address inquiry request,
the site server includes
   a second ROM that stores a second information processing program,
   a second memory that stores permission information, the permission information defining a function that can be used by a user out of functions provided by the image forming apparatus,
   a second processor that executes the second information processing program, and
   a second communication device capable of communicating with the master server, the personal computer, and the image forming apparatus,
the second processor executes the second information processing program to function as
   an authentication processing unit that authenticates the user in response to an authentication request for the user from the personal computer, and returns an authentication result to the personal computer,
   a permission information providing unit that, when the authentication processing unit succeeds in authentication, obtains the permission information corresponding to the user from the second memory, and provides the permission information to the personal computer that sent the authentication request, and
   a second spooler that spools job data from the personal computer, and outputs the job data to the image forming apparatus,
the personal computer includes
   a third ROM that stores a third information processing program,
   a third memory that stores registry,
   a third processor that executes the third information processing program, and
   a third communication device capable of communicating with the master server and the site server, and
the third processor executes the third information processing program to function as
   an address inquiry unit, an IP address of the master server being configured in the address inquiry unit, that, when receiving a job generation instruction from the user, makes an inquiry to the master server about an IP address of the site server to be in cooperation with the personal computer, and obtains an inquiry result,
   an authentication request unit that requests the site server to be in cooperation with the personal computer to authenticate the user on the basis of the inquiry result,
   a permission information obtaining unit that obtains the permission information from the permission information providing unit of the site server to be in cooperation with the personal computer,
   a job generating unit that generates the job data on the basis of the permission information obtained by the permission information obtaining unit, and embeds the IP address of the site server to be in cooperation with the personal computer in the job data on the basis of the inquiry result,
   a mode configuration storing unit that stores an automatic-detection-mode configuration in the registry,
   a first spooler that spools the job data generated by the job generating unit,
   a mode configuration retrieving unit that retrieves the automatic-detection-mode configuration from the registry,
   an address extracting unit that extracts the IP address of the site server to be in cooperation with the personal computer from the job data output from the first spooler, the IP address being embedded in the job data,
   a destination switcher unit that sends the job data to the second spooler of the site server on the basis of the extracted IP address, and
   an operation switcher unit that switches an operation of the destination switcher unit on the basis of the automatic-detection-mode configuration retrieved from the registry.

2. An information processing system, comprising:
a master server at a headquarter site;
an image forming apparatus at a branch-office site;
a site server at the branch-office site; and
a personal computer at the branch-office site, wherein
the master server includes
   a first ROM that stores a first information processing program,
   a first processor that executes the first information processing program, and
   a first communication device capable of communicating with the site server and the personal computer,
the first processor executes the first information processing program to function as
   a mapping management unit that returns, with respect to an address inquiry request for the site server to be in cooperation with the personal computer, the address inquiry request being sent from the personal computer, an IP address of the site server to be in cooperation with the personal computer that sent the address inquiry request,
the site server includes
   a second ROM that stores a second information processing program,
   a second memory that stores permission information, the permission information defining a function that can be used by a user out of functions provided by the image forming apparatus,
a second processor that executes the second information processing program, and
a second communication device capable of communicating with the master server, the personal computer, and the image forming apparatus,
the second processor executes the second information processing program to function as
an authentication processing unit that authenticates the user in response to an authentication request for the user from the personal computer, and returns an authentication result to the personal computer,
a permission information providing unit that, when the authentication processing unit succeeds in authentication, obtains the permission information corresponding to the user from the second memory, and provides the permission information to the personal computer that sent the authentication request, and
a second spooler that spools job data from the personal computer, and outputs the job data to the image forming apparatus,
the personal computer includes
a third ROM that stores a third information processing program,
a third processor that executes the third information processing program, and
a third communication device capable of communicating with the master server and the site server, and
the third processor executes the third information processing program to function as
an address inquiry unit, an IP address of the master server being configured in the address inquiry unit, that, when receiving a job generation instruction from the user, makes an inquiry to the master server about an IP address of the site server to be in cooperation with the personal computer, and obtains an inquiry result,
an authentication request unit that requests the site server to be in cooperation with the personal computer to authenticate the user on the basis of the inquiry result,
a permission information obtaining unit that obtains the permission information from the permission information providing unit of the site server to be in cooperation with the personal computer,
a job generating unit that generates the job data on the basis of the permission information obtained by the permission information obtaining unit,
a first spooler that spools the job data generated by the job generating unit, and
a destination switcher unit that sends the job data output from the first spooler to the second spooler of the site server.

3. The information processing system according to claim 2, wherein
the master server further includes
a first memory that stores an IP address mapping table storing the IP address of the site server and a range of the IP addresses of the personal computers to be in cooperation with the site server in pairs,
the address inquiry unit makes an inquiry to the mapping management unit of the master server about the IP address of the personal computer and the IP address of the site server in cooperation with the personal computer, and
the mapping management unit returns, in response to the address inquiry request of the site server to be in cooperation with the personal computer from the address inquiry unit of the personal computer, the IP address of the site server to be in cooperation with the personal computer that sent the address inquiry request on the basis of the IP address mapping table.

4. The information processing system according to claim 2, wherein
the job generating unit embeds the IP address of the site server to be in cooperation with the personal computer in the job data on the basis of the inquiry result, and
the destination switcher unit
extracts the embedded IP address of the site server to be in cooperation with the personal computer from the job data, and
sends the job data to the second spooler of the site server on the basis of the extracted IP address.

5. The information processing system according to claim 4,
the job generating unit embeds the IP address of the site server to be in cooperation with the personal computer in the job data in a printer job language.

* * * * *